US009413946B2

(12) United States Patent
Hamano

(10) Patent No.: US 9,413,946 B2
(45) Date of Patent: Aug. 9, 2016

(54) IMAGING APPARATUS AND IMAGING METHOD

(71) Applicant: CANON KABUSHIKI KAISHA, Tokyo (JP)

(72) Inventor: Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/231,405

(22) Filed: Mar. 31, 2014

(65) Prior Publication Data

US 2014/0300802 A1    Oct. 9, 2014

(30) Foreign Application Priority Data

Apr. 5, 2013    (JP) .................................. 2013-079855

(51) Int. Cl.
H04N 5/232    (2006.01)
(52) U.S. Cl.
CPC ................................ *H04N 5/23212* (2013.01)

(58) Field of Classification Search
None
See application file for complete search history.

(56) References Cited

U.S. PATENT DOCUMENTS 8,159,597 B2 *    4/2012    Ono ................... H04N 5/23212
                                                          348/326

FOREIGN PATENT DOCUMENTS

| JP | 04-283713 A   | 10/1992 |
|----|---------------|---------|
| JP | 07-298120 A   | 11/1995 |
| JP | 2010-078810 A | 4/2010  |
| JP | 2012-137530 A | 7/2012  |

* cited by examiner

*Primary Examiner* — Twyler Haskins
*Assistant Examiner* — Angel L Garces-Rivera
(74) *Attorney, Agent, or Firm* — Canon USA, Inc. IP Division

(57) ABSTRACT

An imaging apparatus includes a range setting unit configured to set, as a focus adjustment range, a moving range of a focus lens in which the numbers of first pixels obtained while moving the focus lens is equal to or larger than a predetermined value, and an in-focus position calculation unit configured to calculate an in-focus position by using the numbers of second pixels obtained within the focus adjustment range.

4 Claims, 12 Drawing Sheets

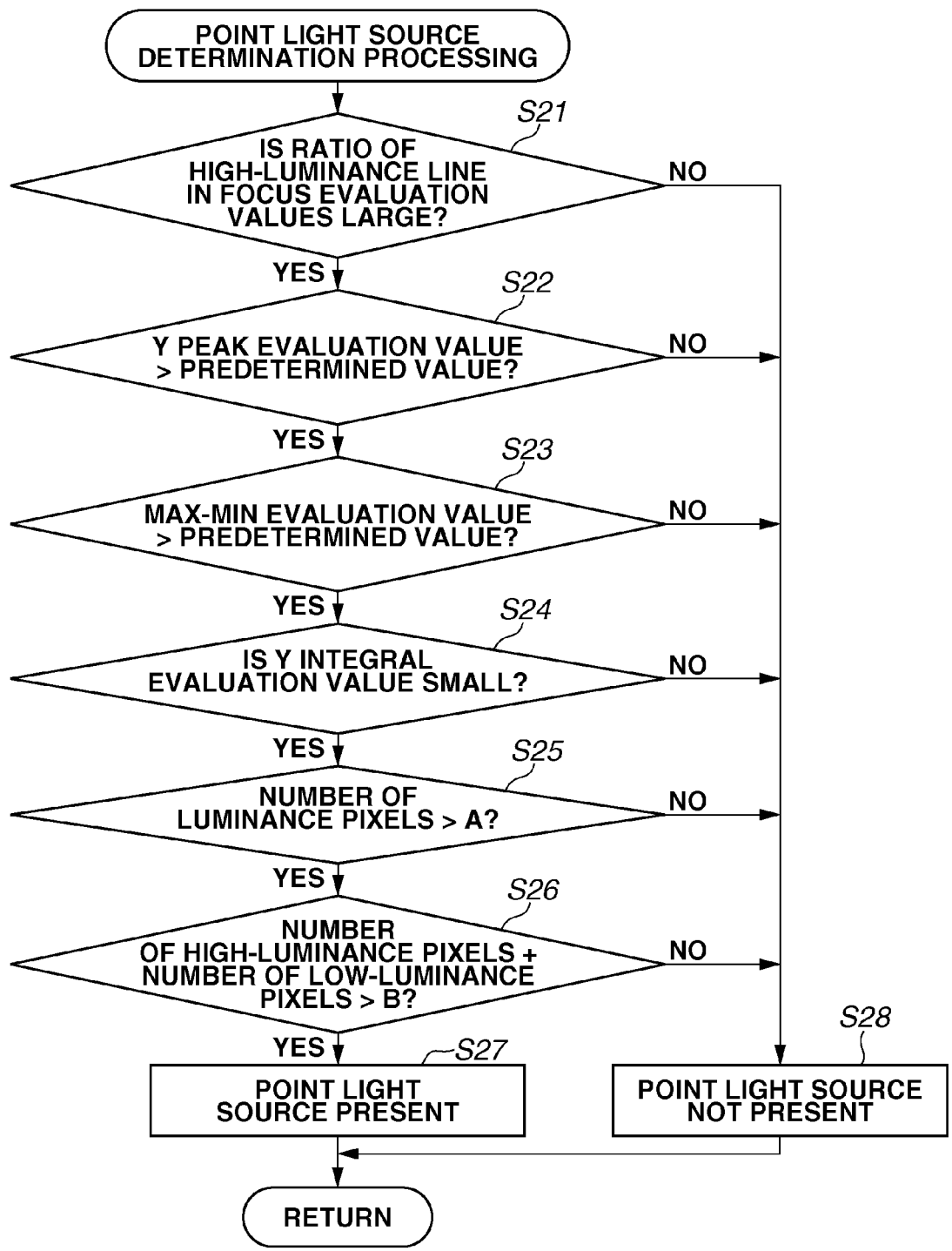

IN-FOCUS STATE

DEFOCUSED STATE

IMAGING APPARATUS AND IMAGING METHOD

BACKGROUND OF THE INVENTION

1. Field of the Invention

One disclosed aspect of the embodiments relates to an imaging apparatus mounted on a digital still camera, a digital video camera, and a mobile phone which perform focus adjustment by using image signals obtained by an image sensor for performing photoelectric conversion of an object image formed by an imaging optical system, and an imaging method thereof.

2. Description of the Related Art

Generally, digital cameras and video cameras employ an autofocus (hereinafter referred to as an AF) method, the so-called contrast detection AF, in which a signal corresponding to the contrast of an object is detected to obtain the in-focus state by using output signals from an image sensor, such as a charge-coupled device (CCD) sensor and a complementary metal-oxide semiconductor (CMOS) sensor.

Evaluation values that have conventionally been proposed for contrast detection AF include a line peak integral evaluation value which is obtained by integrating in the vertical direction the peak value in the evaluation values for each horizontal line. The line peak integral evaluation value is a stable evaluation value which is unsusceptible to noise because of the integral effect. Therefore, the line peak integral evaluation value is suitable for in-focus position detection and direction determination even when a signal sensitively changes with a slight focus movement (see Japanese Patent Application Laid-Open No. 07-298120).

To solve a problem that the in-focus state of a high-luminance object cannot be obtained by using contrast detection AF, there is also proposed a method for detecting the area of a high-luminance portion within the picture and then performing focus adjustment to minimize the area (see Japanese Patent Application Laid-Open No. 04-283713).

With the above-described line peak integral evaluation value, there is a case where the lens position where the value is maximum may not necessarily be the in-focus position. FIG. 9 illustrates a relationship between the line peak integral evaluation value and the focus lens position in the case of an ordinary object. FIG. 10 illustrates a relationship between the line peak integral evaluation value and the focus lens position in the case of a point light source object such as a night view. In the case of an ordinary object, the focus lens position where the line peak integral evaluation value is highest is the in-focus position.

On the other hand, in a case where an object is a point light source such as a night view, the point where the line peak integral evaluation value is highest is not the in-focus position because the size of the point light source in the image changes according to the degree of focusing. Specific examples will be described below with reference to FIGS. 11A and 11B.

FIGS. 11A and 11B illustrate examples of an in-focus image and an out-of-focus image, respectively, in a case where an object is a point light source such as a night view. In the in-focus state as illustrated in FIG. 11A, the object image falls on a small number of lines, each having a large peak value. In the out-of-focus state as illustrated in FIG. 11B, the point light source in the image is blurred with an increase in size. Therefore, the peak value for each line decreases, but the object image falls on a larger number of lines, thereby increasing the line peak integral evaluation value.

Thus, performing focus adjustment so as to increase the line peak integral evaluation value will cause a problem that the in-focus state cannot be obtained in a case where an object is a point light source.

To solve this problem, as described above, there is proposed a technique for detecting the area of a high-luminance portion within the picture and then performing focus adjustment by using the area of the high-luminance portion.

However, there has been a problem that, when a high-luminance portion exists within the picture, the position where the area of the high-luminance portion is smallest is not necessarily the in-focus position. FIG. 12 illustrates a case where the position where the area of the high-luminance portion is smallest is not the in-focus position. The horizontal axis indicates the focus lens position. The vertical axis indicates the area of the high-luminance portion calculated based on the number of pixels outputting a luminance signal having a predetermined threshold value or larger. Referring to FIG. 12, the area of the high-luminance portion has a local minimum value in the vicinity of the in-focus position. This is because the size of the point light source is small in the vicinity of the in-focus position, as illustrated in FIG. 11A.

On the other hand, when the focus lens position moves away from the in-focus position toward the infinite distance side or the closest distance side, the area of the high-luminance portion has a local maximum value, and when the focus lens position further moves away therefrom, the area of the high-luminance portion decreases again. This occurs because, as the defocus amount increases with the movement of the focus lens position, the saturation of the point light source portion is mitigated, thereby decreasing the number of pixels outputting a luminance signal having the predetermined threshold value or larger.

As illustrated in FIG. 12, there is a case where the area of the high-luminance portion has the smallest value at the end of the infinite distance side or the closest distance side within the movable range of the focus lens and therefore the position where the area of the high-luminance portion is smallest is not the in-focus position.

One disclosed aspect of the embodiments is directed to a technique for accurately obtaining the in-focus state of an object such as a point light source which provides a high-luminance portion having a small area in both the in-focus state and the state having a large defocus amount.

SUMMARY OF THE INVENTION

According to an aspect of the embodiments, an imaging apparatus includes an image sensor configured to perform photoelectric conversion of an object image formed by an imaging optical system including a focus lens, a first luminance pixel extraction unit configured to extract first pixels having a luminance equal to or higher than a first threshold value based on image signals output from the image sensor, a second luminance pixel extraction unit configured to extract second pixels having a luminance equal to or lower than a second threshold value, which is smaller than the first threshold value, based on the image signals output from the image sensor, a range setting unit configured to set, as a focus adjustment range, a moving range of the focus lens in which a plurality of numbers of the first pixels obtained while moving the focus lens is equal to or larger than a predetermined value, and an in-focus position calculation unit configured to calculate an in-focus position by using a plurality of numbers of the second pixels obtained within the focus adjustment range.

Further features of the disclosure will become apparent from the following description of exemplary embodiments with reference to the attached drawings.

BRIEF DESCRIPTION OF THE DRAWINGS

FIG. 7 is a flowchart illustrating point light source determination processing to be performed in step S2 in a flowchart illustrated in FIG. 1 according to an exemplary embodiment.

DESCRIPTION OF THE EMBODIMENTS

Description of Block Diagram

Figure 1:
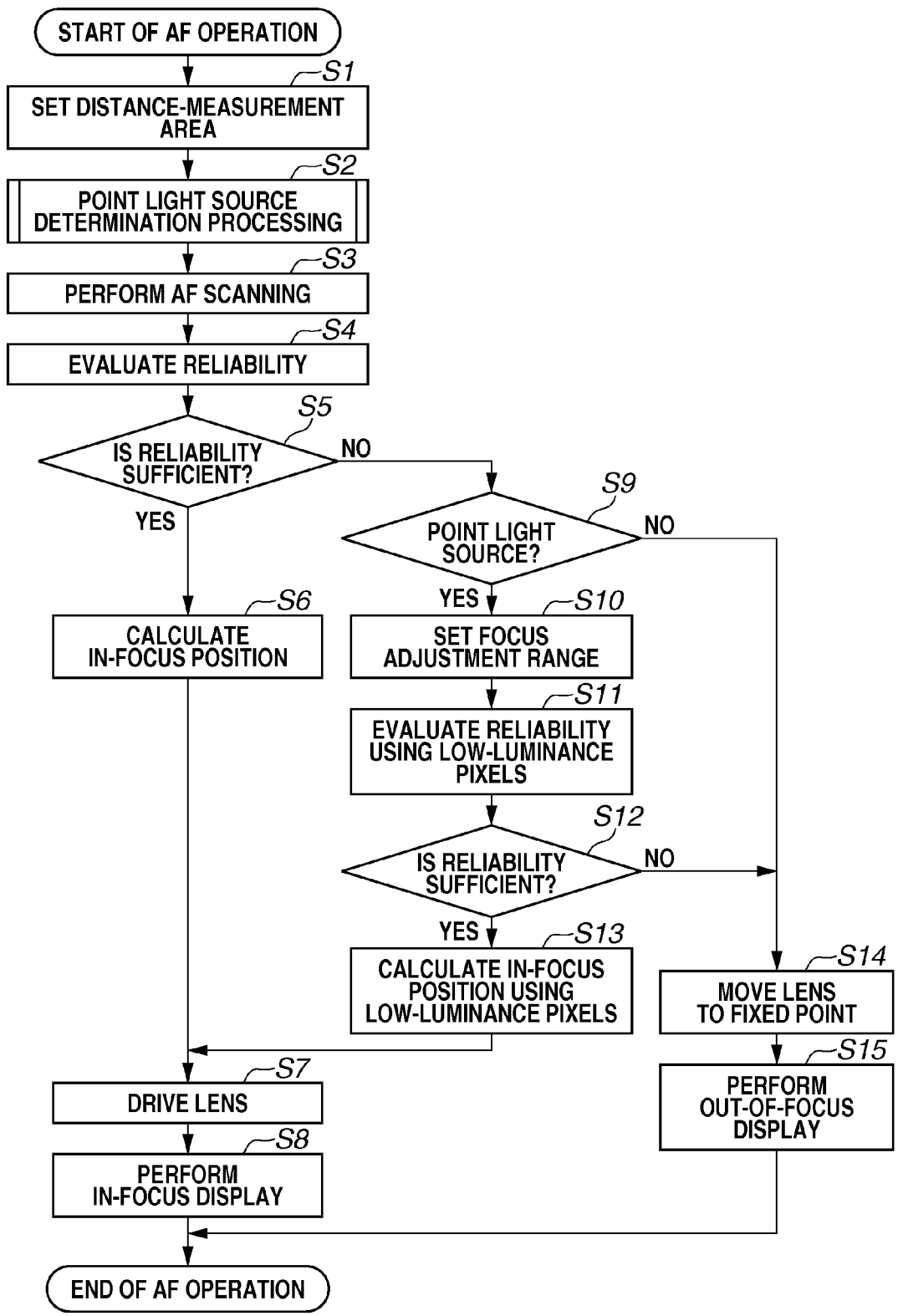
FIG. 1 is a flowchart illustrating an AF operation procedure according to an exemplary embodiment.
Figure 2:
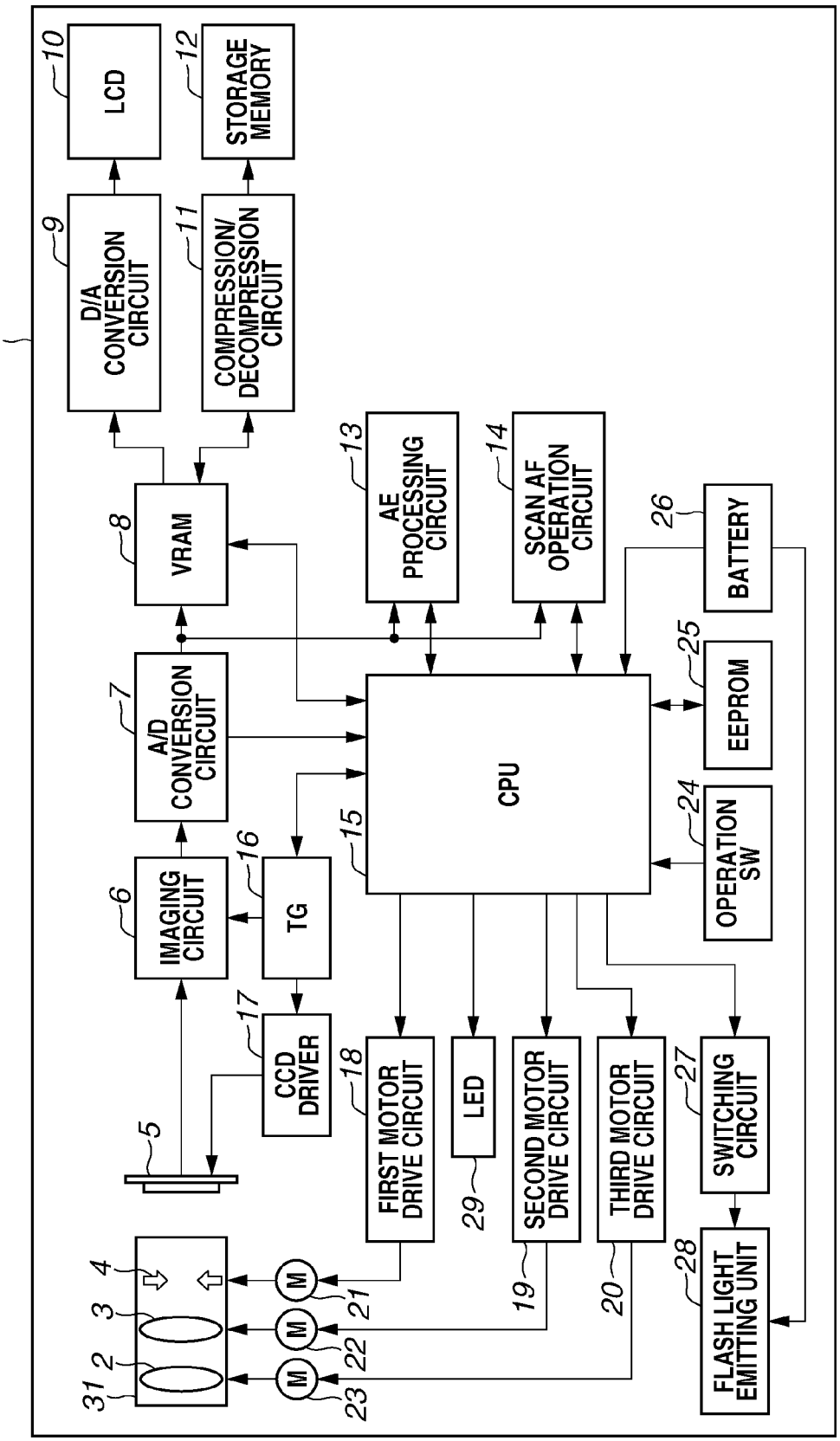
FIG. 2 is a block diagram illustrating an imaging apparatus having a focus adjustment apparatus according to an exemplary embodiment.

One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions. A first exemplary embodiment will be described in detail below with reference to FIGS. 1 to 7. FIG. 2 is a block diagram schematically illustrating an example of a configuration of an imaging apparatus having a focus adjustment apparatus according to the first exemplary embodiment. Although the imaging apparatus according to the present exemplary embodiment may be a digital still camera or a digital video camera, the imaging apparatus is not limited thereto. The disclosure is applicable to any apparatus capable of converting an incident optical image into an electrical image through photoelectric conversion using an image sensor including two-dimensionally arranged pixels, such as an area sensor.

FIG. 2 illustrates an imaging apparatus 1. A zoom lens group 2 and a focus lens group 3 constitute an imaging optical system. A diaphragm 4 serves as both a light amount adjustment unit for controlling the amount of light flux which has passed through the imaging optical system, and an exposure unit. A lens barrel 31 includes the zoom lens group 2, the focus lens group 3, and the diaphragm 4.

An image sensor 5 such as a charge-coupled device sensor (hereinafter referred to as a CCD 5) performs photoelectric conversion of an object image formed from the light flux that has passed through the imaging optical system. A CMOS sensor may be used as the image sensor 5 which performs photoelectric conversion of an object image formed by the imaging optical system including a focus adjustment unit for adjusting the focusing state of the object image. An imaging circuit 6 performs various kinds of image processing on an electrical signal obtained by the photoelectric conversion of the CCD 5 to generate a predetermined image signal.

An analog-to-digital (A/D) conversion circuit 7 converts an analog image signal generated by the imaging circuit 6 into a digital image signal. A video random access memory (VRAM) 8, such as a buffer memory, temporarily stores the digital image signal output from the A/D conversion circuit 7. A digital-to-analog (D/A) conversion circuit 9 reads the digital image signal stored in the VRAM 8, converts the digital image signal into an analog signal, and converts the digital image signal also into an image signal having a form suitable for reproduction output.

An image display device (hereinafter referred to as an LCD) 10, such as a liquid crystal display (LCD), displays the image signal. A storage memory 12 including a semiconductor memory stores image data. A compression/decompression circuit 11 includes a decompression circuit for performing decoding processing and decompression processing on image data, and a compression circuit for performing compression processing and coding processing on image data. The compression/decompression circuit 11 reads the image signal temporarily stored in the VRAM 8, and converts it into a form suitable for storage in the storage memory 12. The image data stored in the storage memory 12 has a form most suitable for reproduction and display.

An automatic exposure (AE) processing circuit 13 receives an output signal from the A/D conversion circuit 7, and performs automatic exposure (AE) processing on the signal. A scan AF operation circuit 14 receives an output signal from the A/D conversion circuit 7, and performs automatic focusing (AF) processing on the signal. The scan AF operation circuit 14 functions as a focus evaluation value calculation processing unit for extracting specific frequency components from image signals output from the imaging area of the image sensor 5 corresponding to a focus detection area and then calculating focus evaluation values. In the present exemplary embodiment, the focus detection area and an AF evaluation area have an identical meaning.

The scan AF operation circuit 14 further calculates evaluation values to be used for point light source determination, or in-focus position calculation for a point light source. These evaluation values will be described in detail below. A central processing unit (CPU) 15 with a built-in calculation memory controls the imaging apparatus 1. A timing generator (hereinafter referred to as a TG) 16 generates predetermined timing signals.

The CPU 15 executes in-focus position calculation and point light source determination by using various evaluation values calculated by the scan AF operation circuit 14.

A CCD driver 17 drives the CCD 5. A diaphragm drive motor 21 drives the diaphragm 4. A first motor drive circuit 18 drives and controls the diaphragm drive motor 21. A focus drive motor 22 drives the focus lens group 3. The focus lens group 3 and the focus drive motor 22 are equivalent to the focus adjustment unit. A second motor drive circuit 19 drives and controls the focus drive motor 22. A zoom drive motor 23 drives the zoom lens group 2. A third motor drive circuit 20 drives and controls the zoom drive motor 23.

The CPU 15 controls the focus drive motor 22 via the second motor drive circuit 19 by using the focus evaluation values calculated by the scan AF operation circuit 14.

An operation switch 24 includes various switch groups. An electrically erasable programmable read only memory (EEPROM) 25 prestores programs for executing various control, and data to be used for performing various operations.

The imaging apparatus 1 further includes a battery 26, a flash light emitting unit 28, a switching circuit 27 for controlling flash light emission of the flash light emitting unit 28, and a display element 29, such as an LED, for displaying the success or failure of the AF operation.

The storage memory 12 is a storage medium for storing image data and the like. Specifically, the storage memory 12 is a stationary semiconductor memory, such as a flash memory, having a card shape or a stick shape. Various types of memories including semiconductor memories (e.g., a card type flash memory detachably formed to an apparatus) and magnetic storage media (e.g., a hard disk and a flexible disk) are applicable as the storage memory 12.

The operation switch 24 includes a main power switch, a release switch, a reproduction switch, a zoom switch, and a switch for turning on and off display of a focus evaluation value signal on a monitor. The main power switch is used to activate the imaging apparatus 1 and supply power to the imaging apparatus 1.

The release switch is used to start an imaging operation (storage operation) and the like. The reproduction switch is used to start a reproduction operation. The zoom switch is used to move the zoom lens group 2 of the imaging optical system to perform a zoom operation.

The release switch is a two-step switch having two strokes: a first stroke (hereinafter referred to as a SW1) for generating an instruction signal for starting the AE processing and AF operation to be performed prior to the imaging operation, and a second stroke (hereinafter referred to as a SW2) for generating an instruction signal for starting the actual exposure operation.

(Description of Various AF Evaluation Values)

Various AF evaluation values to be calculated by using the CPU 15 and the scan AF operation circuit 14 illustrated in FIG. 2 will be described below with reference to FIG. 3.

When the digital signal converted by the A/D conversion circuit 7 is input to the scan AF operation circuit 14, an AF evaluation signal processing circuit 401 converts the digital signal into a luminance signal Y, and subjects the luminance signal Y to gamma correction processing for emphasizing low-luminance components and suppressing high-luminance components.

A method for calculating the number of high-luminance pixels will be described below. The luminance signal Y subjected to the gamma correction processing is input to a line high-luminance pixel number counting circuit 402 for detecting high-luminance pixels for each horizontal line. This circuit calculates for each horizontal line the number of pixels outputting the luminance signal Y larger than a preset threshold value within an AF evaluation area set by an area setting circuit 414.

The output of the line high-luminance pixel number counting circuit 402 is input to a vertical integration circuit 407. This circuit performs the integration in the vertical direction within the AF evaluation area set by the area setting circuit 414, to generate high-luminance pixels. High-luminance pixels are used for point light source determination, and for focus adjustment range setting in in-focus position detection using low-luminance pixels (described below).

In the present exemplary embodiment, the threshold value for determining high-luminance pixels is assumed to be the highest 5% of the luminance distribution of the luminance signal Y. The line high-luminance pixel number counting circuit 402 and the vertical integration circuit 407 correspond to a high-luminance pixel calculation unit serving as a first luminance pixel extraction unit in the appended claims which is configured to calculate, as the number of first pixels, the number of pixels having a luminance equal to or higher than a first threshold value within the focus detection area.

A method for calculating the number of low-luminance pixels will be described below. The luminance signal Y subjected to the gamma correction processing is input to a line low-luminance pixel number counting circuit 403 for detecting low-luminance pixels for each horizontal line. This circuit calculates for each horizontal line the number of pixels outputting the luminance signal Y smaller than the preset threshold value within the AF evaluation area set by the area setting circuit 414.

The output of the line low-luminance pixel number counting circuit 403 is input to a vertical integration circuit 408. This circuit performs the integration in the vertical direction within the AF evaluation area set by the area setting circuit 414, to generate low-luminance pixels.

Low-luminance pixels are used for in-focus position detection (described below). In the present exemplary embodiment, the threshold value for determining low-luminance pixels is assumed to be the lowest 20% of the luminance distribution of the luminance signal Y. The line low-luminance pixel number counting circuit 403 and the vertical integration circuit 408 correspond to a low-luminance pixel calculation unit serving as a second luminance pixel extraction unit in the appended claims which is configured to calculate, as the number of second pixels, the number of pixels having a luminance equal to or lower than a second threshold value, which is smaller than the first threshold value, within the focus detection area.

A method for calculating a Y peak evaluation value will be described below. The luminance signal Y subjected to the gamma correction processing is input to a line peak detecting circuit 404 for detecting the line peak value for each horizontal line. This circuit obtains the Y line peak value for each horizontal line within the AF evaluation area set by the area setting circuit 414. Further, the output of the line peak detecting circuit 404 is input to a vertical peak detecting circuit 409.

This circuit performs peak hold in the vertical direction within the AF evaluation area set by the area setting circuit 414, to generate the Y peak evaluation value. The Y peak evaluation value is effective for determining a high-luminance object or a low-luminance object.

A method for calculating a Y integral evaluation value will be described below. The luminance signal Y subjected to the gamma correction processing is input to a horizontal integration circuit 405 for detecting the integral value for each horizontal line. This circuit obtains the Y integral value for each horizontal line within the AF evaluation area set by the area setting circuit 414.

Further, the output of the horizontal integration circuit 405 is input to a vertical integration circuit 410. This circuit performs the integration in the vertical direction within the AF evaluation area set by the area setting circuit 414, to generate the Y integral evaluation value. The Y integral evaluation value can be used to determine the luminance of the entire AF evaluation area.

A method for calculating a max-min evaluation value will be described below. The luminance signal Y subjected to the gamma correction processing is input to the line peak detecting circuit 404 to obtain the Y line peak value for each horizontal line within the AF evaluation area. Further, the luminance signal Y subjected to the gamma correction processing is input to a line minimum value detecting circuit 406. This circuit detects the Y minimum value for each horizontal line within the AF evaluation area of the luminance signal Y.

The detected Y line peak value and Y minimum value for each horizontal line are input to a subtractor. The subtractor subtracts the minimum value from the line peak value, and inputs the result to a vertical peak detecting circuit 411. This circuit performs peak hold in the vertical direction within the AF evaluation area, to generate the max-min evaluation value. The max-min evaluation value is effective for determining low contrast or high contrast.

A method for calculating an area peak evaluation value will be described below. When the luminance signal Y subjected to the gamma correction processing passes through a band-pass filter (BPF) 412, specific frequency components are extracted to generate a focus signal. This focus signal is input to a line peak detecting circuit 413 serving as a peak hold unit for detecting the line peak value for each horizontal line.

The line peak detecting circuit 413 obtains the line peak value for each horizontal line within the AF evaluation area. A vertical peak detecting circuit 423 holds the obtained line peak value within the AF evaluation area, to generate the area peak evaluation value. Since the area peak evaluation value changes only a little even if an object moves within the AF evaluation area, it is effective for determining a restart for shifting to processing for searching for the in-focus position again from the in-focus state.

A method for calculating an all-line integral evaluation value, an all-line integral evaluation value Hi, and a predetermined line integral evaluation value will be described below. Similarly to the area peak evaluation value, the line peak detecting circuit 413 obtains the line peak value for each horizontal line within the AF evaluation area.

Then, a changeover switch 417 is controlled depending on the output result of a point light source determination unit 151 in the CPU 15 as a control unit to determine whether the line peak value generated by the line peak detecting circuit 413 is to be input to a changeover switch 418 and a vertical integration circuit 420 (second evaluation value generation unit) or to the changeover switch 418 and a predetermined line extracting circuit 419 (first evaluation value generation unit).

Only when the point light source determination unit 151 determines that a point light source exists within the AF evaluation area, the changeover switch 417 is controlled so as to input the line peak value to the predetermined line extracting circuit 419. When the point light source determination unit 151 (described below) determines that no point light source exists within the AF evaluation area, the changeover switch 417 is changed to input the line peak value to the vertical integration circuit 420 which performs the integration for the total number of horizontal scan lines in the vertical direction within the AF evaluation area to generate the all-line integral evaluation value.

The all-line integral evaluation value has a wide dynamic range and high sensitivity because of the integral effect, and therefore is effective as a main evaluation value for AF for performing the focusing operation.

Further, the Y peak value for each horizontal line is input to a comparator 416 having a predetermined threshold value set by the CPU 15, to control the changeover switch 418. Thus, only the peak values of lines where the Y peak value is larger than a predetermined threshold value are added by a vertical integration circuit 421, to generate the all-line integral evaluation value Hi. Through a comparison between the all-line integral evaluation value and the all-line integral evaluation value Hi, it is possible to determine whether the integral evaluation values contain large components of high-luminance lines or large components of other lines.

When the point light source determination unit 151 determines that a point light source exists within the AF evaluation area, the changeover switch 417 is changed to input the line peak values to the predetermined line extracting circuit 419 and the changeover switch 418. The predetermined line extracting circuit 419 extracts the line peak values in descending order of magnitude for the predetermined number of lines preset in a predetermined line number setting circuit 415 by the CPU 15.

Specifically, within the predetermined line extracting circuit 419, a buffer for storing the input line peak values in descending order of magnitude is provided, and data items are stored in the buffer for the number set in the predetermined line number setting circuit 415. The input line peak values are compared with the data items stored in the buffer so that only larger values are left in the buffer.

The predetermined line extracting circuit 419 outputs the data items, extracted in the buffer in this way, to a vertical integration circuit 422 constituting the first evaluation value generation unit. The vertical integration circuit 422 integrates the data items to generate the predetermined line integral evaluation value. Further, as described above, the all-line integral evaluation value Hi is generated from the line peak values input to the changeover switch 418. Furthermore, as described above, the predetermined line number setting circuit 415 inputs to the predetermined line peak extracting circuit 419 the predetermined number of lines subject to line peak extraction set by the CPU 15.

The area setting circuit 414 generates a gate signal for the AF evaluation area for selecting a signal at a predetermined position within the picture set by the CPU 15. The gate signal is input to each of the line high-luminance pixel number counting circuit 402, the line low-luminance pixel number counting circuit 403, the line peak detecting circuit 404, the horizontal integration circuit 405, the line minimum value detecting circuit 406, the line peak detecting circuit 413, the predetermined line extracting circuit 419, the vertical integration circuits 407, 408, 410, 420, 421, and 422, and the vertical peak detecting circuits 409, 411, and 423. The timing for inputting the luminance signal Y to each of the circuits is controlled so that each focus evaluation value is generated with the luminance signal Y within the AF evaluation area.

The AF control unit 152 performs AF control by inputting each focus evaluation value, controlling the focus lens drive motor 22 via the second motor drive circuit 19, and moving the focus lens group 3 in the optical axis direction.

Although, in the present exemplary embodiment, various AF evaluation values are calculated in the horizontal line direction, these values may be calculated in either the horizontal or vertical line direction, or in both directions.

(Description of Flowchart for in-Focus Position Determination)

A focusing operation (AF operation) to be performed by the imaging apparatus 1 having the above-described configuration according to an exemplary embodiment will be described below with reference to FIG. 1. FIG. 1 is a flowchart illustrating an AF operation procedure to be performed by the focus adjustment apparatus according to an exemplary embodiment. A control program for this operation is executed by the CPU 15.

First, when the AF operation is started, the area setting circuit 414 included in the CPU 15 sets the AF evaluation area for performing focus adjustment to an object. In the processing in step S1, one distance-measurement area is set in an image.

Figure 4:
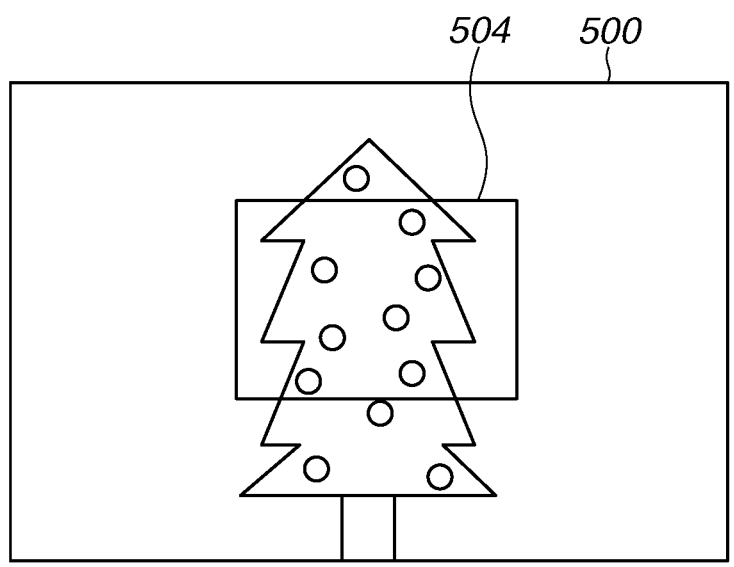
FIG. 4 illustrates setting of a focus detection area (AF evaluation area) according to an exemplary embodiment.

FIG. 4 illustrates setting of an AF evaluation area as a focus detection area. Referring to FIG. 4, an AF evaluation area 504 is set at the center of an imaging screen 500. In the AF evaluation area 504 serving as a focus detection area, image signals for performing focus adjustment are evaluated by the AF operation (described below). The purpose of the AF operation is to perform focus adjustment to an object intended by a photographer within the AF evaluation area 504 as a focus detection area. In the present exemplary embodiment, the AF evaluation area 504 includes ornaments on a tree as point light sources.

Returning to FIG. 1, the description of the flowchart will be continued.

Figure 3:
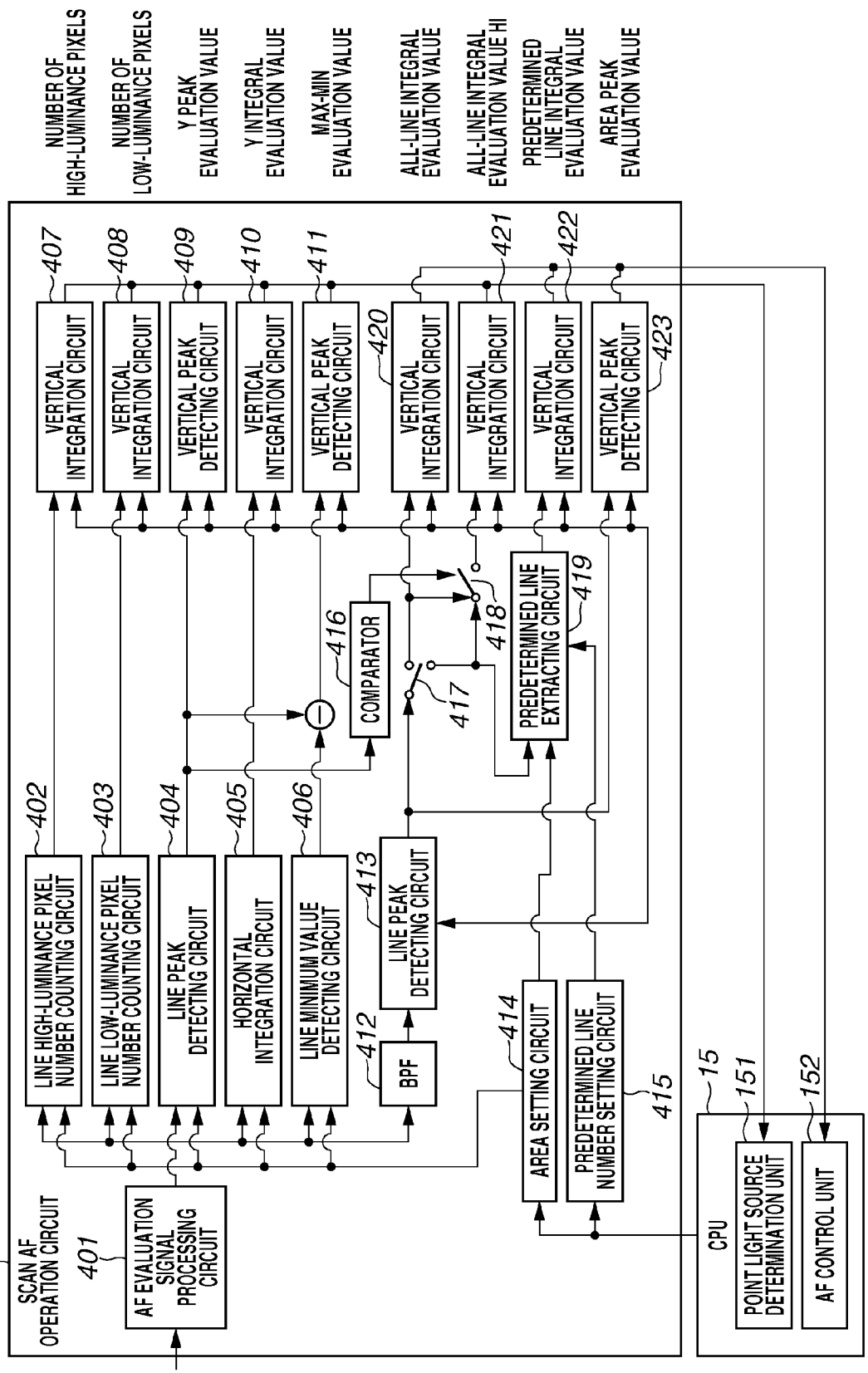
FIG. 3 is a block diagram illustrating a circuit for calculating various AF evaluation values according to an exemplary embodiment.

In step S2, the point light source determination unit 151 in the CPU 15 illustrated in FIG. 3 performs point light source determination processing. The determination processing will be described in detail below. As described above, based on the result of the point light source determination processing, the CPU 15 controls the changeover switch 417 illustrated in FIG. 3 to set whether to calculate the all-line integral evaluation value or obtain the predetermined line integral evaluation value.

In step S3, the CPU 15 performs AF scanning (focus adjustment operation) by using each distance-measurement area set in step S1 and the focus evaluation value setting set in step S2. In AF scanning, while moving the focus lens group 3 in increments of a predetermined amount from the scanning start position to the scanning end position, the scan AF operation circuit 14 stores in the CPU 15 each of the above-described focus evaluation values at each position of the focus lens group 3.

With respect to details on the AF scanning operation by using the all-line integral evaluation value or the predetermined line integral evaluation value, for example, a technique discussed in Japanese Patent Application Laid-Open No. 2012-137530, as described in FIGS. 9 to 13 may be used.

In step S4, the CPU 15 performs reliability evaluation of the local maximum value of the obtained focus evaluation values. In this case, the CPU 15 calculates the position of the focus lens group 3 having a local maximum focus evaluation value. Further, the CPU 15 evaluates the reliability of the change curve of the focus evaluation values in the vicinity of the local maximum value. In this reliability evaluation, the CPU 15 evaluates whether the obtained focus evaluation values have a sufficient change curve shape to obtain a sufficient in-focus state of the object.

Figure 11A:
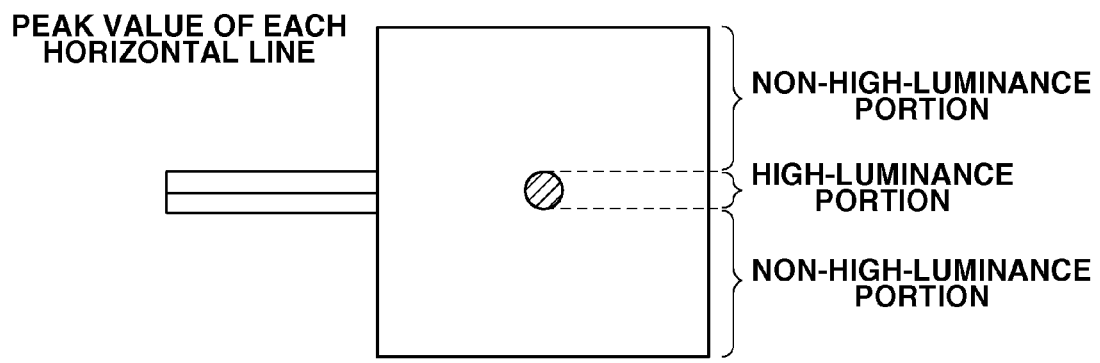
FIGS. 11A and 11B illustrate examples of an in-focus image and an out-of-focus image in the case of a point light source object according to the conventional technique.
Figure 11B:
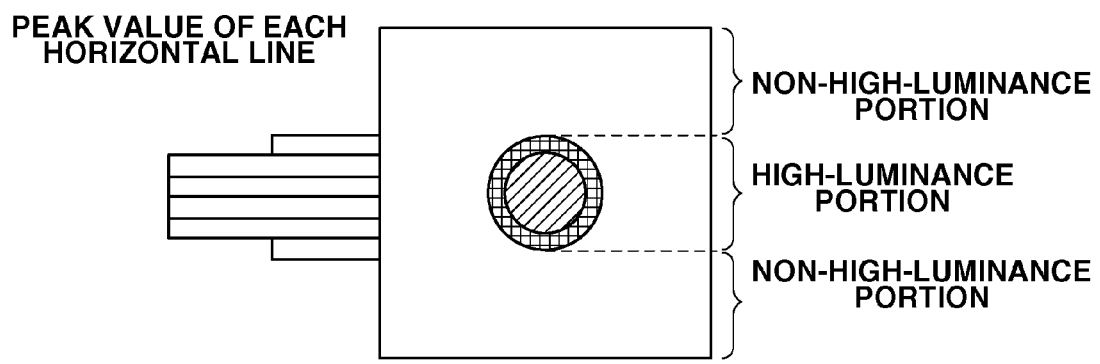
Figure 12:
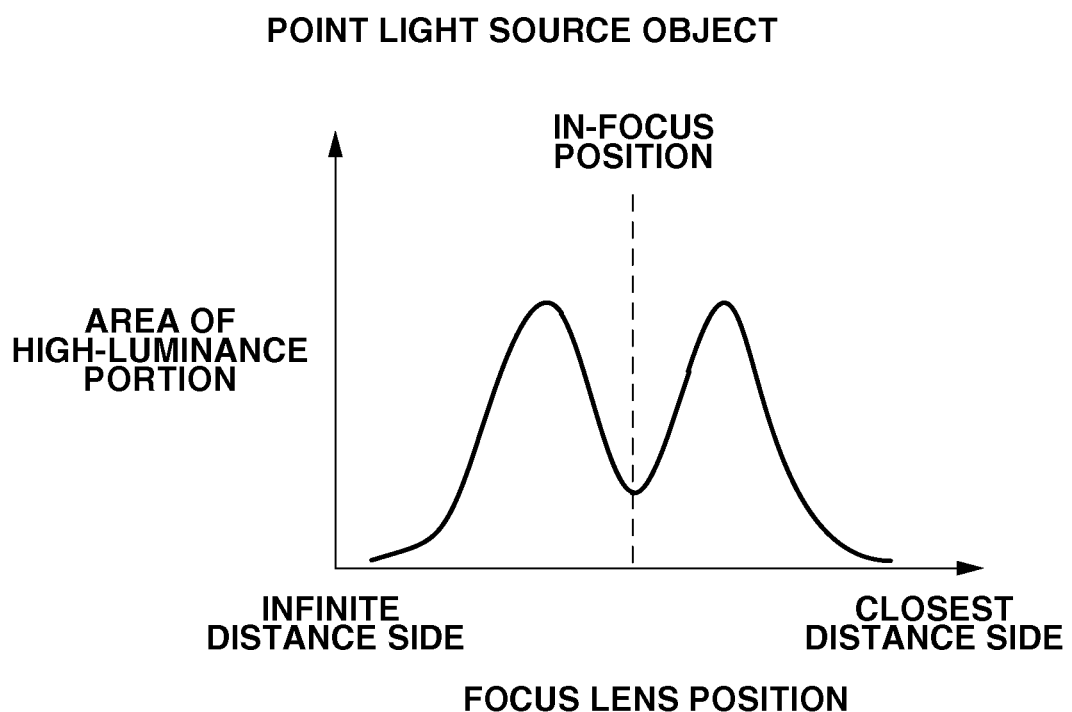
FIG. 12 illustrates a case where the position where the area of the high-luminance portion is smallest is not the in-focus position according to the conventional technique.

As for a detailed reliability determination method, for example, a method illustrated with reference to FIGS. 11 to 13 in Japanese Patent Application Laid-Open No. 2010-078810 may be used.

Specifically, the CPU 15 determines whether the focus evaluation values indicating the in-focus state provides a reliable mountain shape based on the difference between the maximum and minimum values of the focus evaluation values, the length of the inclined portion having a predetermined slope threshold (SlopeThr) or larger, and the gradient of the inclined portion. Thus, the reliability determination can be performed.

In step S5, the CPU 15 determines whether the reliability is sufficient based on the result of the reliability determination in step S4. When the CPU 15 determines that the reliability is sufficient (YES in step S5), then in step S6, the CPU 15 calculates the peak position by using the all-line integral evaluation value or the predetermined line integral evaluation value. In step S7, the AF control unit 152 drives the focus lens group 3 to the position corresponding to the peak position.

In step S7, when there is a plurality of local maximum focus evaluation values having reliability, the CPU 15 sets, as the in-focus position, the local maximum value indicating the focus lens position closer to the closest distance side and then drives the focus lens group 3. In step S8, the CPU 15 performs the in-focus display and ends the AF operation.

On the other hand, when the CPU 15 determines that the reliability is not sufficient (NO in step S5) based on the result of the reliability determination in step S4, the processing proceeds to step S9. This step corresponds to a case where a reliability determination unit determines that reliability is not sufficient. In step S9, the CPU 15 determines whether a point light source exists within the AF evaluation area based on the point light source determination processing performed in step S2. When the CPU 15 determines that a point light source exists (YES in step S9), the processing proceeds to step S10.

(Description of Method for Setting Moving Range of Focus Lens)

In step S10, the CPU 15 sets the moving range of the focus lens (focus adjustment range) by using the transition of the number of high-luminance pixels obtained during the AF scanning. A method for setting the moving range of the focus lens (the focus adjustment range) will be described below with reference to FIG. 5.

Figure 5:
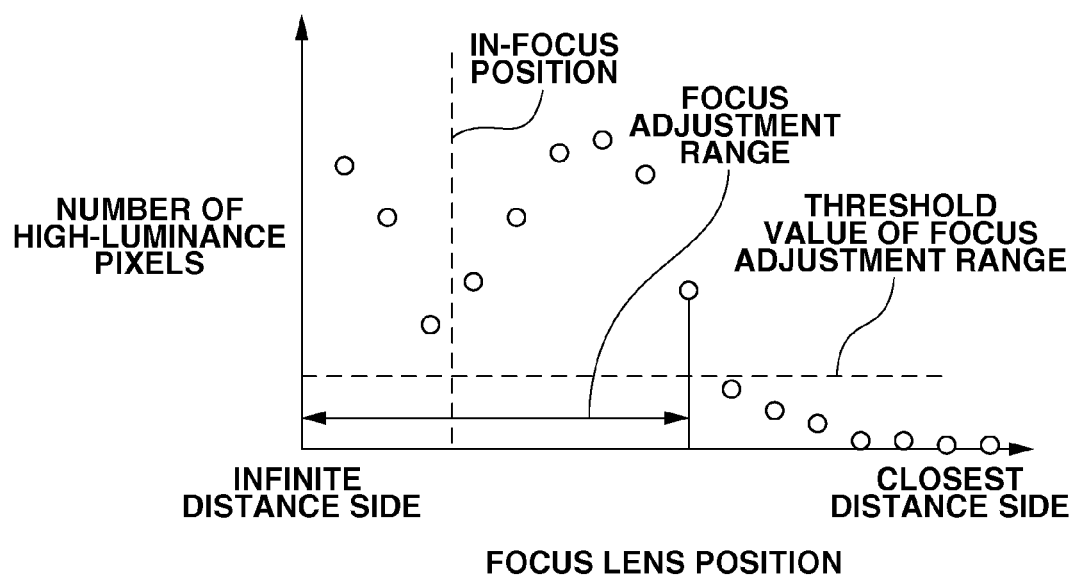
FIG. 5 illustrates the number of high-luminance pixels calculated for each focus lens position according to an exemplary embodiment.

FIG. 5 illustrates the number of high-luminance pixels calculated for each focus lens position. The horizontal axis indicates the focus lens position where the focus lens is movable from the infinite distance side to the closest distance side. The vertical axis indicates the number of high-luminance pixels.

As described above, when an object image includes a point light source, the number of high-luminance pixels has a local minimum value in the vicinity of the in-focus position. When the object image is defocused by moving the focus lens position from the vicinity of the in-focus position toward the closest distance side or the infinite distance side, the point light source as the object is burred with an increase in the number of saturated pixels, thereby increasing the number of high-luminance pixels. When the object image is further defocused, the number of saturated pixels decreases to zero, thereby starting to reduce the number of high-luminance pixels.

In the case illustrated in FIG. 5, if the in-focus position is detected so that the area of the high-luminance portion is smallest, as with the above-described technique discussed in Japanese Patent Application Laid-Open No. 04-283713, the number of high-luminance pixels is smallest on the closest distance side, resulting in incorrect focus adjustment. In an exemplary embodiment, the CPU 15 sets the moving range of the focus lens (the focus adjustment range) by using high-luminance pixels.

As the focus adjustment range to be used in focus adjustment (described below), the CPU 15 sets the focus lens positions where the calculated number of high-luminance pixels is equal to or larger than the threshold value for the focus adjustment range denoted by the horizontal broken line illustrated in FIG. 5. This corresponds to the processing in which a focus adjustment range setting unit (CPU 15) uses first pixels (high-luminance pixels) to set a range for adjusting the focusing state.

Returning to FIG. 1, the description of the flowchart will be continued.

When the CPU 15 completes setting the moving range of the focus lens (focus adjustment range) in step S10, then in step S11, the CPU 15 performs reliability evaluation by using low-luminance pixels. The reliability evaluation using low-luminance pixels will be described below with reference to FIG. 6.

(Description of Reliability Evaluation Using Low-Luminance Pixels)

Figure 6:
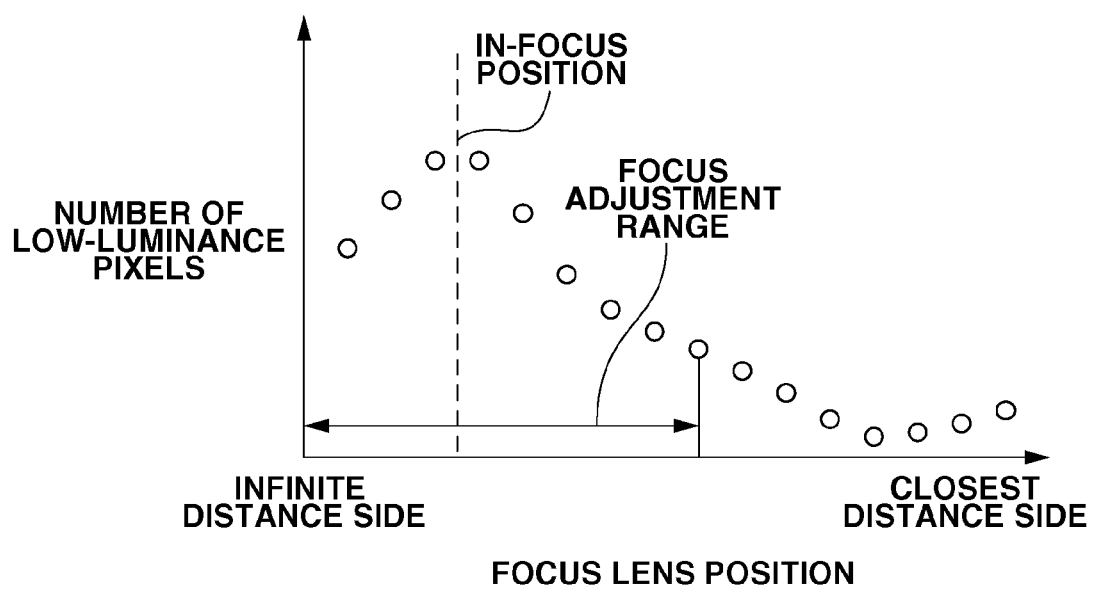
FIG. 6 illustrates the number of low-luminance pixels calculated for each focus lens position according to an exemplary embodiment.

FIG. 6 illustrates the number of low-luminance pixels calculated for each focus lens position. The horizontal axis indicates the focus lens position where the focus lens is movable from the infinite distance side to the closest distance side. The vertical axis indicates the number of low-luminance pixels.

In a shooting scene such as a night view where a point light source exists and the surroundings of the point light source are comparatively dark, the number of low-luminance pixels within the AF evaluation area is highest in the in-focus state. This is because, as the scene is defocused from the in-focus state, a high-luminance portion such as a point light source is burred, thereby increasing the luminance value around the high-luminance portion.

Accordingly, the number of low-luminance pixels decreases. Since the number of low-luminance pixels to be obtained has a maximum value at the in-focus position similarly to the focus evaluation values, the CPU 15 may perform reliability determination in step S11 in a similar way to the reliability determination performed on the focus evaluation values. As described above, the CPU 15 determines whether the number of low-luminance pixels indicating the in-focus state provides a reliable mountain shape based on the difference between the maximum and minimum values, the length of the inclined portion having a predetermined slope threshold (SlopeThr) or larger, and the gradient of the inclined portion. Thus, the reliability determination can be performed. (see FIGS. 11 to 13 in Japanese Patent Application Laid-Open No. 2010-078810)

However, the reliability determination is performed by using the low-luminance pixels obtained at the focus lens positions within the moving range set in step S10.

In step S12, the CPU 15 determines whether the reliability insufficient based on the reliability determination value calculated in step S11. When the CPU 15 determines that the reliability is sufficient (YES in step S12), then in step S13, the CPU 15 performs in-focus position calculation using the low-luminance pixels. When calculating the in-focus position in step S13, the CPU 15 also uses the low-luminance pixels illustrated in FIG. 6. Similarly to the calculation of the peak position by using the above-described focus evaluation values, such as the all-line integral evaluation value or the predetermined line integral evaluation value, the CPU 15 calculates the peak position by using low-luminance pixels.

However, the in-focus position calculation is performed by using the low-luminance pixels obtained at the focus lens positions within the focus adjustment range set in step S10. This corresponds to the processing in which an in-focus position calculation unit (CPU 15) uses second pixels (low-luminance pixels) to calculate the in-focus position within the moving range.

Then, in step S7, the AF control unit 152 drives the focus lens group 3 to a position corresponding to the peak position. In step S8, the CPU 15 performs the in-focus display and ends the AF operation.

On the other hand, when the CPU 15 determines that the reliability is not sufficient (NO in step S12), then in step S14, the CPU 15 drives the focus lens group 3 to a preset position called a fixed point where the probability of existence of an object is high. In step S15, the CPU 15 performs the out-of-focus display and ends the AF operation.

Specifically, in the present exemplary embodiment, when the reliability determination unit determines that the reliability of the focus evaluation values is lower than a first predetermined value, the CPU 15 calculates the in-focus position by using image signals output from the imaging area of the image sensor 5 corresponding to the second pixels. On the other hand, when the reliability determination unit determines that the reliability of the above-described focus evaluation values is equal to or higher than the first predetermined value, the CPU 15 calculates the in-focus position by using image signals output from the imaging area of the image sensor 5 corresponding to all the pixels within the focus detection area.

Again, features in performing in-focus position calculation by using high-luminance pixels and low-luminance pixels will be described below.

Generally, in a shooting scene such as a night view, the area of the high-luminance portion is smaller than the area of the low-luminance portion, and the luminance distribution of the high-luminance portion is concentrated on the brighter side (the side providing larger luminance values). Therefore, to detect a change in the number of pixels in the high-luminance portion, a threshold value needs to be determined in the narrow luminance distribution. This is because the high-luminance pixel portion has lost luminance information because of saturation.

In such a situation, it is difficult to determine the threshold value if the luminance distribution of high-luminance pixels within the AF evaluation area changes depending on the shooting scene. For example, in a scene including many saturated high-luminance pixels, to detect a change in the number of high-luminance pixels due to defocusing, it is necessary to set a high luminance value as a threshold value. On the other hand, in a scene including many unsaturated high-luminance pixels, setting a low luminance value as a threshold value can increase the amount of change in the number of high-luminance pixels due to defocusing, thereby facilitating the detection.

To solve the problem, the threshold value may be changed according to the number of high-luminance pixels. However, this is not an ultimate solution because there are various possible shooting scenes.

In the case of a small absolute number of pixels in the high-luminance portion, the number sensitively changes with a change in the defocus amount, that is, decreases regardless of whether the defocus amount is large or small. Further, because of a small absolute number of high-luminance pixels, when the focus condition is changed, the number of high-luminance pixels tends to change with noise. Therefore, performing in-focus position detection based on a change in the number of high-luminance pixels will lead to accuracy degradation.

On the other hand, in a shooting scene such as a night view, the area of the low-luminance portion is larger than the area of the high-luminance portion, and the luminance distribution of the low-luminance portion is dispersed on the darker side (the side providing smaller luminance values) to some extent. Therefore, a threshold value for detecting a change in the number of pixels in the low-luminance portion can be determined in a comparatively wide luminance distribution. While the high-luminance pixel portion has lost luminance information because of saturation, the low-luminance pixel portion is seldom subjected to underexposure, and has luminance information indicating darkness (low luminance).

In such a situation, even if the luminance distribution of low-luminance pixels within the AF evaluation area changes depending on the shooting scene, it is possible to set a threshold value for detecting low-luminance pixels, which can maintain stable accuracy in detecting a change in the number of low-luminance pixels due to defocus change.

Further, because of a large absolute number of pixels in the low-luminance portion, the number stably changes with a change in the defocus amount. Specifically, it increases with a decrease in the defocus amount, and decreases with an increase in the defocus amount. Further, because of a large absolute number of low-luminance pixels, when the focus condition is changed, the number of low-luminance pixels changes with a slight noise. Accordingly, in-focus position detection based on a change in the number of low-luminance pixels can be performed with high accuracy. With a lens having a large defocus range, the number of low-luminance pixels may increase in the case of a very large defocus amount.

In the case of a very large defocus amount, since the luminance signal of each pixel approaches the average output of surrounding pixels, the above-described phenomenon occurs depending on the threshold value for detecting low-luminance pixels. However, in an exemplary embodiment, a threshold value for high-luminance pixels is provided to set a focus adjustment range, so that the focus lens positions where the number of low-luminance pixels increases with a large defocus amount are excluded from the focus adjustment range. This can be achieved by using the above-described features of high-luminance pixels and low-luminance pixels.

(Description of Point Light Source Determination Processing)

The point light source determination processing performed in step S2 illustrated in FIG. 1 will be described below with reference to FIG. 7.

In step S21, the CPU 15 determines whether the ratio of the high-luminance line in the focus evaluation values is large. When the ratio of the high-luminance line is large (YES in step S21), the processing proceeds to step S22. On the other hand, when the ratio of the high-luminance line is not large (NO in step S21), the processing proceeds to step S28. The CPU 15 obtains the ratio of the high-luminance line in the focus evaluation values by comparing the all-line integral evaluation value with the all-line integral evaluation value Hi. If the all-line integral evaluation value is close to the all-line integral evaluation value Hi, the ratio of the high-luminance line peak value in the all-line integral evaluation value is large. When a point light source object exists, the ratio of the high-luminance line peak value in the integral evaluation values increases. This can be used as a factor for determining a point light source object.

When the predetermined line integral evaluation value is used, the all-line integral evaluation value Hi is generated but the all-line integral evaluation value is not generated. In this case, it is not possible to compare the all-line integral evaluation value with the all-line integral evaluation value Hi. Therefore, when the changeover switch 417 is first changed to use the predetermined line integral evaluation value instead of the all-line integral evaluation value, the CPU 15 stores the all-line integral evaluation value Hi at the time.

The CPU 15 compares the stored value with a newly obtained all-line integral evaluation value Hi. When the reduction amount of the newly obtained all-line integral evaluation value Hi is large, the CPU 15 performs control, assuming that the ratio of the high-luminance line in the focus evaluation values is not large.

In step S22, since the Y peak evaluation value is large when a point light source object exists, the CPU 15 determines whether the Y peak evaluation value is larger than a predetermined value. When the Y peak evaluation value is larger than the predetermined value (YES in step S22), the processing proceeds to step S23. On the other hand, when the Y peak evaluation value is not larger than the predetermined value (NO in step S22), the processing proceeds to step S28. In step S23, since the difference between the maximum and minimum values of the luminance on lines where a point light source exists is large when a point light source object exists, the CPU 15 determines whether the max-min evaluation value is larger than a predetermined value. When the max-min evaluation value is larger than the predetermined value (YES in step S23), the processing proceeds to step S24. On the other hand, when the max-min evaluation value is not larger than the predetermined value (NO in step S23), the processing proceeds to step S28. In step S24, since the entire screen is dark when an image of a point light source object is captured, the CPU 15 determines whether the Y integral evaluation value is small. When the Y integral evaluation value is small (YES in step S24), the processing proceeds to step S25. On the other hand, when the Y integral evaluation value is not small (NO in step S24), the processing proceeds to step S28.

In step S25, to determine whether the point light source covers a certain area within the AF evaluation area, the CPU 15 determines whether the number of high-luminance pixels is larger than a predetermined threshold value A. When the number of high-luminance pixels is larger than the predetermined threshold value A (YES in step S25), the processing proceeds to step S26. On the other hand, when the number of high-luminance pixels is not larger than the predetermined threshold value A (NO in step S25), the processing proceeds to step S28. In step S26, to determine whether the shooting scene is a night view having the high-luminance portion and the low-luminance portion in a large area, the CPU 15 determines whether the sum of the number of high-luminance pixels and the number of low-luminance pixels is larger than a predetermined threshold value B. When the sum is larger than the predetermined threshold value B (YES in step S26), the processing proceeds to step S27. On the other hand, when the sum is not larger than the predetermined threshold value B (NO in step S26), the processing proceeds to step S28. This corresponds to the processing in which a high-luminance scene determination unit (the point light source determination unit 151) performs high-luminance scene determination by using the first pixels (high-luminance pixels) and the second pixels (low-luminance pixels).

In step S27, taking the above-described processing into consideration, the CPU 15 determines that a point light source exists, completes the processing, and uses the predetermined line integral evaluation value as the focus evaluation value. On the other hand, in step S28, the CPU 15 determines that no point light source exists, completes the processing, and uses the all-line integral evaluation value as the focus evaluation value.

Not all of the point light source determination processes (steps S21 to S26) need to be performed. When the shooting scene is determined to include a point light source after completion of several determination processes, some of the processes may be omitted. Thus, the speed of the point light source determination processing can be improved.

In the present exemplary embodiment, there is provided a luminance scene determination unit for determining whether the shooting scene has a luminance equal to or higher than a third threshold value, by using image signals output from the imaging area of the image sensor 5 corresponding to the first and second pixels. When the luminance scene determination unit determines that the shooting scene has a luminance equal to or higher than the third threshold value, the CPU 15 calculates the in-focus position by using image signals output from the imaging area of the image sensor 5 corresponding to the second pixels.

Although, in the present exemplary embodiment, AF processing to be performed for still image shooting has been described, the exemplary embodiment is applicable to AF processing for moving image shooting. In this case, similarly to the above-described processing, in a case where the reliability of the focus evaluation values is not sufficient and the object is determined to include a point light source, the CPU 15 performs AF control by using low-luminance pixels, in a similar way to the focus evaluation values, in a focus lens range in which the number of existing high-luminance pixels is equal to or larger than a predetermined value. AF processing for moving image shooting such as a wobbling operation is discussed in above-described Japanese Patent Application Laid-Open No. 2012-137530, and the description thereof will be omitted here.

As described above, performing focus adjustment using high-luminance and low-luminance pixels can accurately obtain the in-focus state of an object such as a point light source which provides a high-luminance portion having a small area in both the in-focus state and the state having a large defocus amount.

In the present exemplary embodiment, the CPU 15 performs in-focus position calculation by using high-luminance and low-luminance pixels only when the reliability of the all-line focus evaluation value or the predetermined line focus evaluation value is not sufficient. When performing in-focus position calculation by using the focus evaluation values, the CPU 15 can change the shape of the focus evaluation values by changing the BPF 412. In the case of low-luminance pixels, on the other hand, such a change cannot be made since in-focus position calculation is based on the number of pixels. Therefore, when the number of low-luminance pixels changes only a little within the focus adjustment range, there is a concern that in-focus accuracy may be degraded. Accordingly, in the present exemplary embodiment, only when the reliability of the focus evaluation values is not sufficient even after changing the BPF 412, performing in-focus position calculation using low-luminance pixels is performed, so that the in-focus position of an object including various point light sources can be calculated with high accuracy.

Further, performing point light source determination using high-luminance and low-luminance pixels enables point light source determination to be performed with higher accuracy by using the existing evaluation values.

Further, in the present exemplary embodiment, in-focus position calculation is performed by using low-luminance pixels. This is because, as described above, the number of low-luminance pixels is generally larger than the number of high-luminance pixels in an imaging condition including a high-luminance portion such as a night view. However, in some rare cases, there is an imaging condition where there are many areas of the high-luminance portion.

In such a case, a situation similar to the above-described situation where providing a threshold value for high-luminance pixels is difficult occurs in setting a threshold value for low-luminance pixels. Therefore, under an imaging condition where many areas of the high-luminance portion exist, a range for adjusting the focusing state may be set by using low-luminance pixels, and in-focus position may be calculated by using high-luminance pixels. In this case, the range where the number of low-luminance pixels exceeds the predetermined threshold value is determined as the range for adjusting the focusing state. Within this range, the CPU 15 detects, as the in-focus position, a position where the number of high-luminance pixels is smallest.

It is not necessary to exclusively perform in-focus position calculation using low-luminance pixels and in-focus position calculation using high-luminance pixels. For example, in-focus position calculation may be performed by using the difference between the number of low-luminance pixels and the number of high-luminance pixels. In the vicinity of the in-focus position, the number of low-luminance pixels has a maximum value and the number of high-luminance pixels has a local minimum value. Therefore, subtracting the number of high-luminance pixels from the number of low-luminance pixels allows calculation of a new evaluation value that is inclined more steeply and locally maximum in the vicinity of the in-focus position. The in-focus position may be calculated by using this evaluation value. Similarly, the ratio between the number of low-luminance pixels and the number of high-luminance pixels may be used.

Further, weighting may be performed on low-luminance and high-luminance pixels to calculate the in-focus position. For example, to place an importance on low-luminance pixels and reduce the influence of high-luminance pixels, a gain may be applied to low-luminance pixels before calculating the difference between the number of low-luminance pixels and the number of high-luminance pixels.

It is also possible to, based on the magnitude relationship between the number of low-luminance pixels and the number of high-luminance pixels, change the rate of contribution to the in-focus position calculated by using the image signals output from the imaging area of the image sensor 5 corresponding to low-luminance pixels, and the image signals output from the imaging area of the image sensor 5 corresponding to high-luminance pixels, so as to increase the influence of pixels having the larger number.

It is not necessary to exclusively perform setting of a focusing state adjustment range using low-luminance pixels and setting of a focusing state adjustment range using high-luminance pixels. For example, a focusing state adjustment range may be set by using the sum of the number of low-luminance pixels and the number of high-luminance pixels. Both the number of low-luminance pixels and the number of high-luminance pixels decrease as the focusing state becomes out-of-focus. Therefore, providing a threshold value for the sum of the number of low-luminance pixels and the number of high-luminance pixels allows setting of a focusing state adjustment range. Similarly, the product of the number of low-luminance pixels and the number of high-luminance pixels may be used.

Further, weighting may be performed on low-luminance and high-luminance pixels to set a focusing state adjustment range. For example, to place an importance on low-luminance pixels and reduce the influence of high-luminance pixels, a gain may be applied to low-luminance pixels before calculating the sum of the number of low-luminance pixels and the number of high-luminance pixels.

It is also possible to, based on the magnitude relationship between the number of low-luminance pixels and the number of high-luminance pixels, change the rate of contribution to the focusing state adjustment range set by using the image signals output from the imaging area of the image sensor 5 corresponding to low-luminance pixels, and the image signals output from the imaging area of the image sensor 5 corresponding to high-luminance pixels, so as to reduce the influence of pixels having the larger number.

A method for calculating the number of low-luminance pixels according to a second exemplary embodiment will be described below with reference to FIGS. 8A and 8B. In the second exemplary embodiment, a luminance output threshold value for determining low-luminance pixels is changed depending on the imaging condition.

Figure 8A:
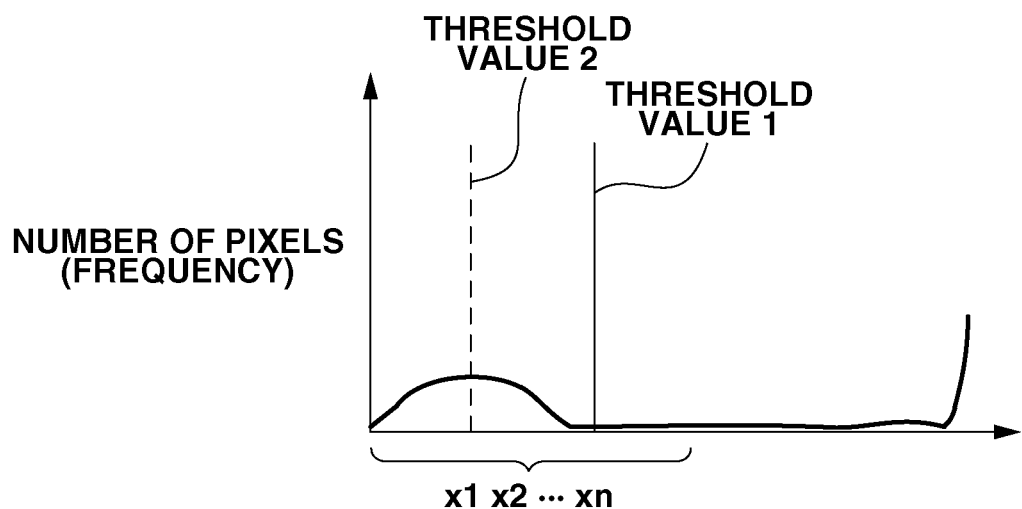
FIGS. 8A and 8B illustrate threshold value settings for low-luminance pixels according to a second exemplary embodiment.
Figure 8B:
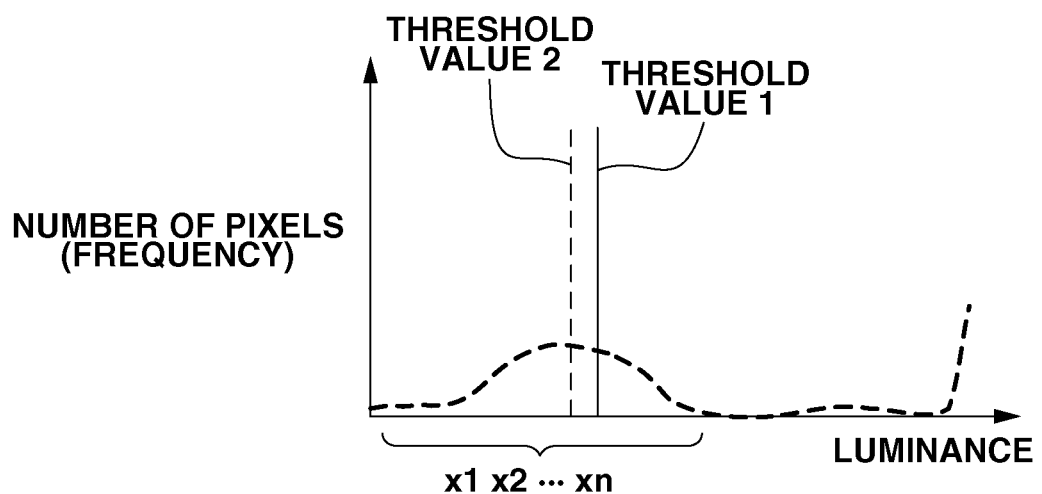
Figure 9:
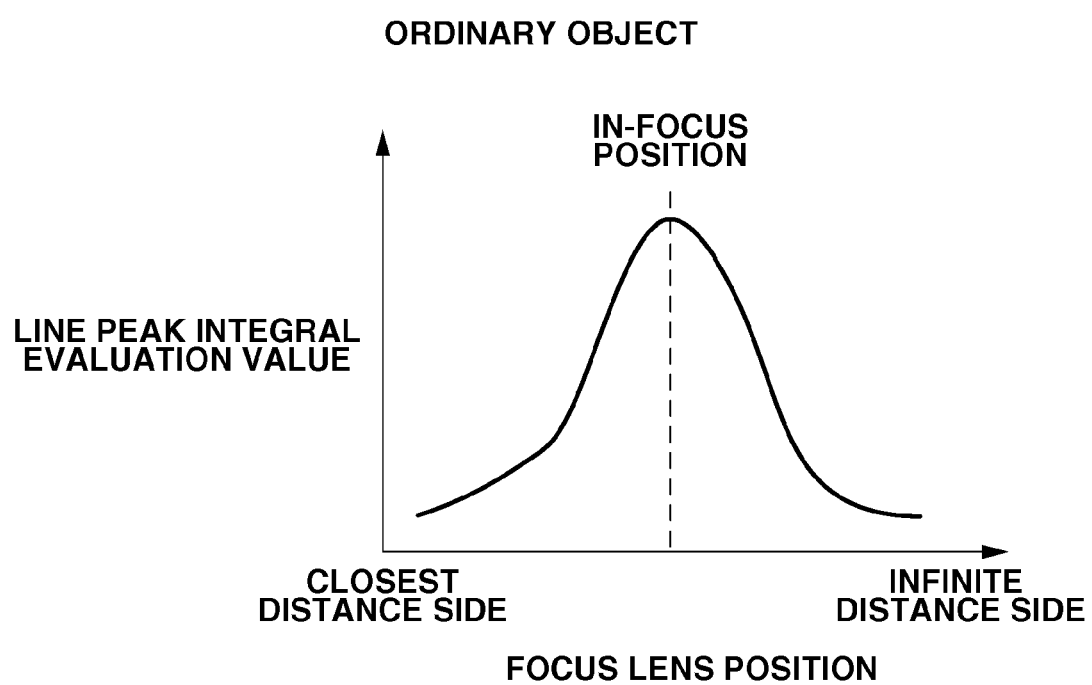
FIG. 9 illustrates a relationship between the line peak integral evaluation value and the focus lens position in the case of an ordinary object according to a conventional technique.
Figure 10:
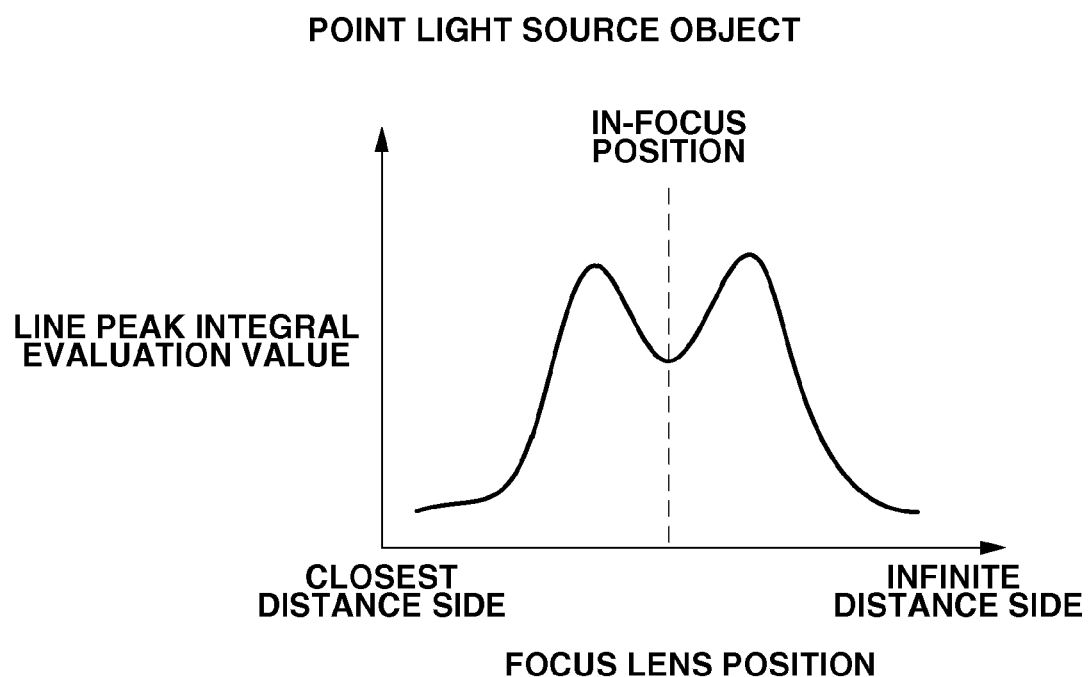
FIG. 10 illustrates a relationship between the line peak integral evaluation value and the focus lens position in the case of a point light source object according to the conventional technique.

FIGS. 8A and 8B illustrate examples of histograms of luminance signals within the AF evaluation area in calculating various AF evaluation values described in the first exemplary embodiment. The horizontal axis indicates the magnitude of the luminance signal output, and the vertical axis indicates the number of pixels indicating a certain magnitude of the luminance signal output.

FIG. 8A and FIG. 8B illustrate examples of different imaging conditions. FIG. 8A illustrates an imaging condition where a point light source exists within the AF evaluation area, and the surroundings of the point light source are dark. The imaging condition illustrated in FIG. 8A is, for example, a scene such as a night view including buildings, streetlights, and other point light sources. Generally, in a histogram with an imaging condition which is more likely to include point light sources, such as a night view, pixels are separately distributed in the high-luminance portion including saturated pixels corresponding to the point light source area and in the low-luminance portion corresponding to then on-point light source area.

FIG. 8B illustrates an imaging condition where the same point light source as that illustrated in FIG. 8A exists within the AF evaluation area, but the surroundings of the point light source are brighter than those illustrated in FIG. 8A. Although FIG. 8B includes the same point light source object as that illustrated in FIG. 8A, the non-point light source area is slightly brighter, as is the case with an evening view. Although the pixel distribution of the high-luminance portion including saturated pixels corresponding to the point light source area is the same as that illustrated in FIG. 8A, the pixel distribution of the low-luminance portion corresponding to the non-point light source area is slightly shifted toward the high-luminance side.

In the first exemplary embodiment, in counting low-luminance pixels, a threshold value for the luminance signal output to be determined as a low-luminance pixel is set to the lowest 20% of the luminance distribution of the luminance signal Y. As illustrated in FIGS. 8A and 8B, using the same threshold value for imaging conditions with different pixel distributions in the low-luminance portion may cause too large or too small number of pixels to be counted as low-luminance pixels.

For example, when low-luminance pixels are counted by using a luminance output threshold value 1 illustrated in FIGS. 8A and 8B, all pixels in the low-luminance portion are counted as low-luminance pixels in the example illustrated in FIG. 8A. On the other hand, in the example illustrated in FIG. 8B, about ⅔ of pixels in the low-luminance portion are counted as low-luminance pixels. In FIG. 8B, according to the focus adjustment state, the defocused state of the point light source changes and the luminance output of the low-luminance portion exceeds or falls below the threshold value 1, enabling detection of a change in the number of low-luminance pixels.

However, as illustrated in FIG. 8A, even if the focus adjustment state changes and accordingly the luminance output of the low-luminance portion changes, there are a small number of pixels providing a luminance output which exceeds or falls below the first threshold value 1. This makes it difficult to detect a change in the number of low-luminance pixels.

In the second exemplary embodiment, setting a threshold value adaptable to such a situation makes it always easy to detect a change in the number of low-luminance pixels with a change in the focus adjustment state.

In the second exemplary embodiment, a threshold value for counting the number of low-luminance pixels is set to the center-of-gravity position of the low-luminance portion in the histogram.

A second threshold value 2 indicated by a broken line in FIGS. 8A and 8B is set to the center-of-gravity position of the low-luminance portion in the histogram. A center-of-gravity position Lg is calculated by the following formula.

$$Lg = (x_1 + x_2 + \ldots + x_n) \div n \qquad (1)$$

Referring to the formula (1), a subscript is added to "x" in ascending order of the luminance output for each magnitude range of the luminance signal output at the time of histogram calculation. "n" is set depending on the luminance range to be used for obtaining the center-of-gravity position.

Referring to the formula (1), to calculate the center-of-gravity position of the low-luminance portion in the histogram, the luminance range for calculating the center-of-gravity position Lg may be set to about a half of the entire luminance range.

Other factors are similar to those in the first exemplary embodiment. Although, in the present exemplary embodiment, the threshold value is set to the center-of-gravity position of the low-luminance portion in the histogram, the method for setting a threshold value position is not limited thereto. A threshold value may be set in an area in which pixels of the low-luminance portion exist to some extent. For example, a threshold value may also be calculated by adding an offset to or subtracting an offset from the center-of-gravity position of the low-luminance portion in the histogram, or by applying a gain to the center-of-gravity position.

The second threshold value 2 changes according to the histogram information about the luminance within the focus detection area for calculating the number of low-luminance pixels by using the second luminance pixel extraction unit.

In the present exemplary embodiment, the second threshold value when the luminance of all pixels within the focus detection area is smaller than a second predetermined value is made larger than the second threshold value when the luminance of all pixels within the focus detection area is equal to or larger than the second predetermined value.

(Description of Program)

The above-described exemplary embodiments can also be achieved when a storage medium storing a program code of software for implementing the functions of the above-described exemplary embodiments is supplied to a system or an apparatus, and a computer (or CPU, microprocessor unit (MPU), etc.) of the system or the apparatus reads the program code stored in the storage medium and then executes it.

In this case, the program code itself read from the storage medium implements new functions according to the exemplary embodiments, and therefore the storage medium storing the program code and the program constitute the exemplary embodiments.

Storage media for supplying the program code include, for example, a flexible disk, a hard disk, an optical disc, a magnetic optical disk, a compact disc read only memory (CD-ROM), a compact disc recordable (CD-R), a compact disc rewritable (CD-RW), a digital versatile disc read only memory (DVD-ROM), a digital versatile disc random access memory (DVD-RAM), a digital versatile disc rewritable (DVD-RW), a digital versatile disc recordable (DVD-R), a magnetic tape, a nonvolatile memory card, a read only memory (ROM), and so on.

The disclosure includes not only a case where the functions of the above-described exemplary embodiments are implemented when the computer reads the program code and executes it but also a case where the functions of the above-described exemplary embodiments are implemented when an operating system (OS) operating on the computer executes a part or whole of actual processing based on instructions of the program code.

The disclosure further includes a case where the program code read from the storage medium is loaded into a memory included in a function expansion board inserted into the computer or a function expansion unit connected to the computer, and the functions of the above-described exemplary embodiments are implemented when a CPU included in the function expansion board or the function expansion unit executes a part or whole of actual processing based on instructions of the program code.

(Description of Mobile Phone)

Mobile phones are also applicable as an exemplary embodiment.

A mobile phone according to the present exemplary embodiment is provided with an e-mail function, an Internet connection function, an image capturing and reproduction functions, in addition to a voice call function.

The exemplary embodiments are applicable to image capturing.

A communication unit of the mobile phone performs voice data and image data communication with other phones based on a communication method conforming to a communication carrier a user subscribes. At the time of a voice call, a voice processing unit converts voice data from a microphone into a form suitable for data transmission, and transmits it to the communication unit.

According to the exemplary embodiments, it is possible to accurately obtain the in-focus state of an object such as a point light source which provides a high-luminance portion having a small area in both the in-focus state and the state having a large defocus amount.

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-079855 filed Apr. 5, 2013, which is hereby incorporated by reference herein in its entirety.

What is claimed is:

1. An imaging apparatus comprising;
    an image sensor configured to perform photoelectric conversion of an object image formed by an imaging optical system including a focus lens;
    a first luminance pixel extraction unit configured to extract first pixels having a luminance equal to or higher than a first threshold value based on image signals output from the image sensor;
    a second luminance pixel extraction unit configured to extract second pixels having a luminance equal to or lower than a second threshold value, which is smaller than the first threshold value, based on the image signals output from the image sensor;
    a range setting unit configured to set, as a focus adjustment range, a moving range of the focus lens in which a plurality of numbers of the first pixels obtained while moving the focus lens is equal to or larger than a predetermined value; and
    an in-focus position calculation unit configured to calculate an in-focus position by only using a plurality of numbers of the second pixels obtained within the focus adjustment range,
    wherein the in-focus position calculation unit determines, as the in-focus position, a position of the focus lens having the highest number of second pixels among the plurality of numbers of second pixels obtained within the focus adjustment range.

2. The imaging apparatus according to claim 1, wherein the first threshold value used when the number of the first pixels is larger than a predetermined value is larger than the first threshold value used when the number of the first pixels is equal to or smaller than the predetermined value.

3. The imaging apparatus according to claim 1, wherein the second threshold value used when a luminance value calculated based on the image signals output from the image sensor is smaller than a third threshold value is smaller than the second threshold value used when the luminance value calculated based on the image signals output from the image sensor is equal to or larger than the third threshold value.

4. An imaging method comprising;
    extracting first pixels having a luminance equal to or higher than a first threshold value based on image signals output from an image sensor for performing photoelectric conversion of an object image formed by an imaging optical system including a focus lens;
    extracting second pixels having a luminance equal to or lower than a second threshold value, which is smaller than the first threshold value, based on the image signals output from the image sensor;
    setting, as a focus adjustment range, a moving range of the focus lens in which a plurality of numbers of the first pixels obtained while moving the focus lens is equal to or larger than a predetermined value; and calculating an in-focus position by only using a plurality of numbers of the second pixels obtained within the focus adjustment range,
wherein calculating comprises determining, as the in-focus position, a position of the focus lens having the highest number of second pixels among the plurality of numbers of second pixels obtained within the focus adjustment range.

* * * * *